PEAK DETECTOR

SYNC. SIGNAL GENERATOR    STARTER MULTIVIBRATOR

United States Patent Office 3,541,419
Patented Nov. 17, 1970

3,541,419
CONTROL CIRCUIT FOR VIBRATORY ANTENNA
Arnolds Jansons, Indianapolis, Ind., assignor to the United States of America as represented by the Secretary of the Navy
Filed Feb. 25, 1969, Ser. No. 802,078
Int. Cl. G05g 5/00; H01q 3/02
U.S. Cl. 318—627                                    7 Claims

ABSTRACT OF THE DISCLOSURE

A control circuit for enabling a small, mechanically resonant, torsion bar supported, radar antenna to begin and maintain a high frequency, sinusoidal scanning motion during a radar system "fast scan" mode of operation. The circuit includes self-starting means for initiating the oscillatory scanning motion via a multivibrator and servomotor, a scan oscillation generating loop to continuously sustain the scanning motion by supplying energy through the controlled servomotor to compensate for system losses, and a scan amplitude control loop for cntrolling the amplitude of the scanning motion by regulating the gain of the oscillation generating loop.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention is in the field of electrical motive power systems, and more specifically in the area of followup systems of motor control, for initiating and controlling the scanning motion of a small, torsion bar supported, radar antenna through a servomotor driving means, during the "fast scan" mode of operation of a radar system.

In the design and development of radar systems to be utilized in various applications where space, weight, and available power are at a premium, the need has arisen for an antenna control circuit capable of initially exciting a small mechanically resonant, torsion bar supported antenna system to cause it to produce and maintain a high frequency sinusoidal scanning motion whenever a "fast scan" mode of operation is required. Such a circuit must be highly reliable and be of minimum size and weight. The present invention fulfills this need.

Some prior art scanning systems for providing high frequency, oscillatory motion have utilized an ordinary, single direction, continuously rotating, electric motor to excite a mechanical system comprised of inertia and a spring means. Such a system is constructed to act as a mechanically resonant circuit tuned to the desired antenna scan frequency, and the motor serves as a power source to maintain the oscillatory motion by compensating for system losses. In general, such prior art devices have been limited to relatively large shipborne or shore radar installations having antennas with very large inertias. One mechanically resonant antenna and drive system of this general type is disclosed in United States Pat. 3,125,888, issued Mar. 24, 1964, to Sheldon Fox and Jacob Rabinow, entitled "Resonant Oscillating Antenna Drive."

In applications utilizing small, high frequency mechanical scanning antenna systems which employ antennas of two feet or less, the antenna inertias are very small and the relative magnitudes of frictional torque become so great that designers of prior art systems have found it very difficult, if not impossible, to assure self-starting of the antenna oscillatory motion, and to control and maintain the desired amplitude of oscillations, once started. The present invention provides control circuitry which overcomes these difficulties.

SUMMARY OF THE INVENTION

The present invention provides a reliable, solid state control circuit for starting, maintaining, and controlling the high frequency scanning motion of a small, torsion bar supported, mechanically resonant radar antenna system. The circuit is comprised of three basic control loops: (1) a scan oscillation generation loop, (2) a scan amplitude control loop, and (3) an automatic oscillation starter and sustainer loop. The first of these, the scan oscillation generation loop, includes a servomotor having its drive shaft coupled via gearing means to a suitable torsion bar supported vibratory antenna system designed to be mechanically resonant at the desired high frequency scanning rate, a position transducer means coupled to the antenna system to provide electrical feedback signals indicative of the instantaneous physical position with respect to boresight of the scanning antenna, an integrator circuit for receiving the feedback signal from the position transducer means and providing an output signal shifted in phase by ninety degrees from the received feedback signal, a variable gain modulator means for receiving the feedback control signal from the integrator and producing a modulated carrier output control signal, and a servo-amplifier, coupled between the modulator and the servomotor, for amplifying the control signal which drives the servomotor so as to aid the oscillations of the mechanically resonant antenna system.

The scan amplitude control loop includes an operational amplifier and a scan amplitude, or "peak," detector means. The operational amplifier is employed as an isolation amplifier to couple the output signal of the position transducer to the peak detector without appreciably loading the transducer. The output signal of the peak detector is coupled to the variable gain control means of the modulator for controlling the modulator gain in accordance with the peak amplitude of the oscillatory scan as sensed by the position transducer and peak detector. The peak detector is a threshold device which allows the modulator to operate at maximum gain until a desired predetermined peak scan amplitude is reached, as indicated by the transducer signal, then reduces the gain of the modulator to the level required by the servomotor to maintain the oscillations of the antenna at the desired peak scan level.

The automatic oscillation starter and sustainer loop includes a starter multivibrator, and a synchronizing signal generator. This loop assures automatic self-starting of the antenna oscillatory motion when the system is initially turned on, or when the scan oscillations have been temporarily stopped for some reason, such as a momentary power failure. The multivibrator operates at a frequency slightly below the mechanically resonant frequency of the antenna system in the absence of a synchronizing signal, and provides a square wave output signal to the modulator which causes the servomotor to excite the antenna system into oscillation. Once the antenna system begins oscillating the transducer-integrator output signal is applied to the sync generator which, in turn, provides a synchronizing signal to the multivibrator, causing it to increase its frequency to that of the oscillating antenna.

BRIEF DESCRIPTION OF THE DRAWINGS

The objects and attendant advantages, features, and uses will become more apparent to those skilled in the art as the description proceeds when considered with the accompanying figures of drawing wherein like reference numerals designate like or corresponding parts, and in which.

DESCRIPTION OF THE PREFERRED EMBODIMENT

Figure 1:
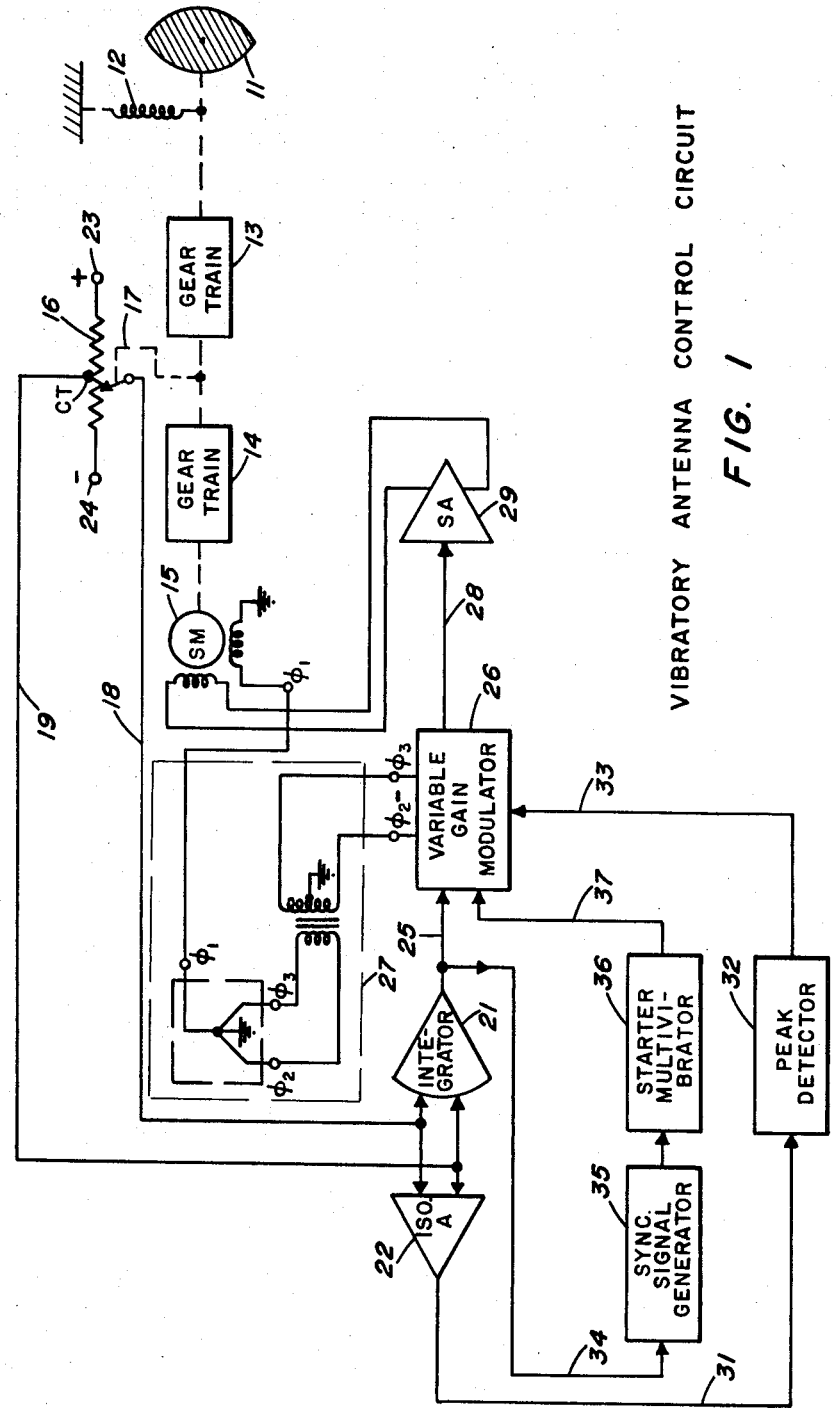
FIG. 1 is a block-schematic diagram of a vibratory antenna system utilizing the control circuit of this invention.

Referring more particularly to FIG. 1, there is shown an antenna system designed to be mechanically resonant at the desired scanning frequency comprised of an antenna and its inertia elements 11, a spring means or torsion bar 12 to provide the mechanical oscillating force, gear trains and connecting shafts 13 and 14, and the rotor of a servomotor 15. The remainder of the figure represents the control circuit of this invention and includes a position transducer 16 shown here in the form of a center-tapped potentiometer whose variable or "wiper" contact is mechanically coupled to a connecting shaft of the resonant antenna via a coupling means 17, and electrically coupled via a conductor 18 to the inputs of an integrator 21 and an isolation amplifier 22, respectively. The center tap of potentiometer 16 is coupled via a conductor 19 to the remaining inputs of integrator 21 and amplifier 22. The ends of the fixed resistance of potentiometer 16 are coupled to positive and negative sources of equal magnitude direct current potential 23 and 24, respectively. Potentiometer 16 produces an electrical signal indicative of the instantaneous physical position of antenna 11 with respect to bore-sight, which is represented by the "zero" potential, or center tap, position of potentiometer 16. Although transducer 16 is represented as a D.C. potentiometer in the embodiment of FIG. 1, it will be understood by those skilled in the art that an A.C. type of transducer, such as a synchro or resolver, as used in carrier servo systems may be employed in place of the D.C. potentiometer if a demodulator is used between the synchro or resolver and the integrator, in order to convert the A.C. transducer output signal to a form suitable for integrator 21.

The output of integrator 21 is coupled via a conductor 25 to one of two summing inputs of a variable gain modulator 26, which also receives an input signal from a three-phase power source 27. One of these phases of source 27, shown as $\phi_1$, in FIG. 1, is coupled to provide the fixed motor voltage to servomotor 15, and the other two phases are coupled so as to provide a difference phase ($\phi_2 - \phi_3$), which is ninety degrees out of phase with $\phi_1$, to modulator 26. Modulator 26 combines the input from integrator 21 with this difference phase, and the combined output of modulator 26 is coupled via a conductor 28 to a servoamplifier 29 whose output comprises the variable motor voltage to servomotor 15 which, in conjunction with the fixed motor voltage of phase $\phi_1$ of source 27, determines the direction and amount of drive produced by the servomotor for controlling the mechanically resonant vibrations of antenna 11.

The signal from position transducer 16 is coupled, via isolation amplifier 22 and conductor 31, to a scan amplitude peak detector means 32. The output of peak detector 32 is coupled via a conductor 33 to the gain control input terminal of modulator 26. Peak detector 32 allows modulator 26 to operate at maximum gain until the transducer signal exceeds the threshold level of the peak detector which indicates that antenna 11 has reached a desired predetermined peak scan amplitude, then it produces an output signal which reduces the gain of the modulator to a level which causes servomotor 15 to maintain the oscillations of antenna 11 at this desired level.

The output of integrator 21 is also provided via a conductor 34 to the input of a sync signal generator 35 for producing a signal to synchronize the output of a starting multivibrator 36 with the control signal from integrator 21. The output of multivibrator 36 is coupled via a conductor 37 to an input of modulator 26 to cause modulator 26 to activate servomotor 15, thereby producing automatic self-starting of the mechanically resonant antenna system, whenever the circuit is energized and the antenna 11 has previously stopped oscillating, as indicated by an absence of signal from integrator 21.

Figure 2:
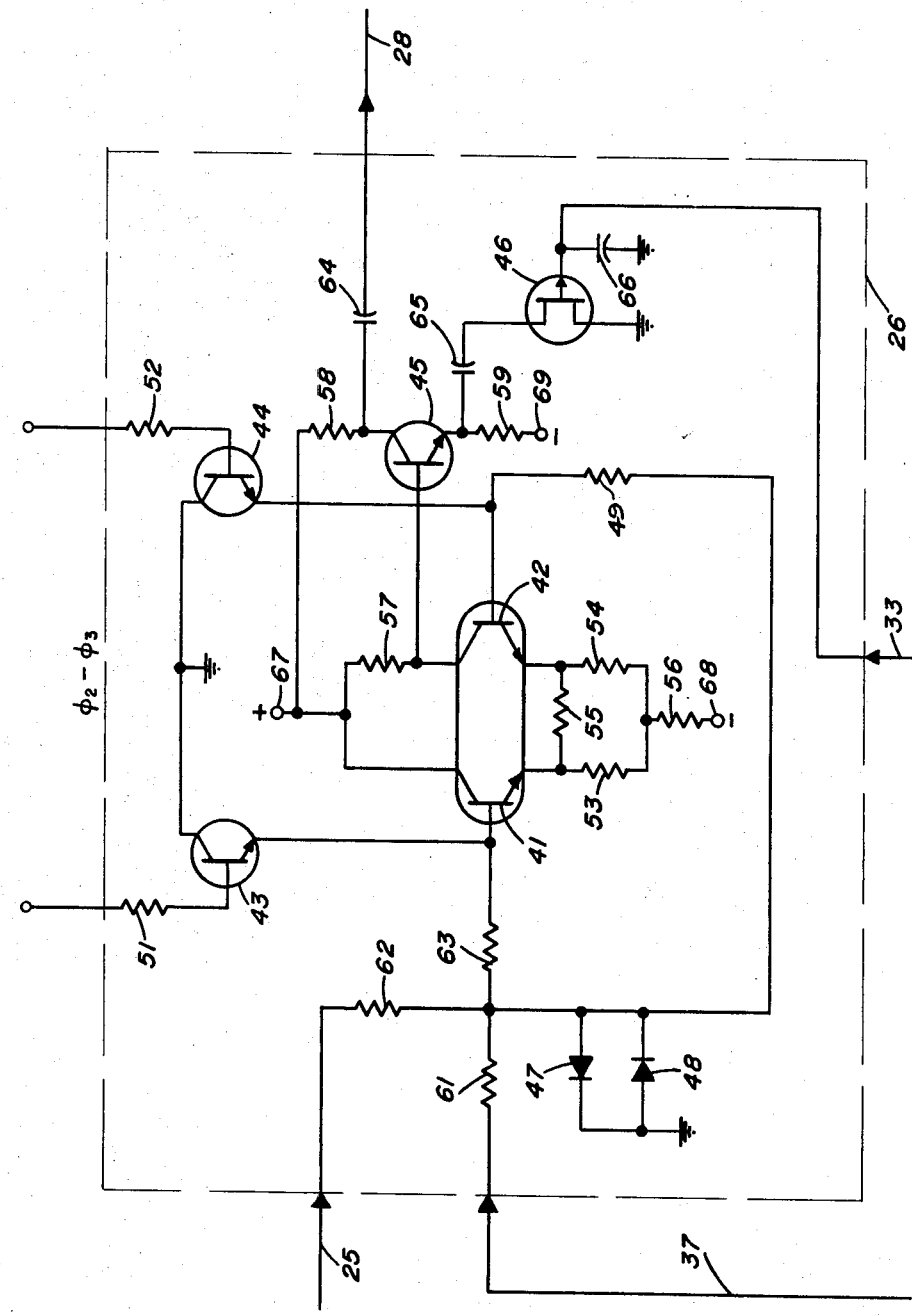
FIG. 2 is a schematic representation of a suitable embodiment of the variable gain modulator of FIG. 1.
Figure 3:
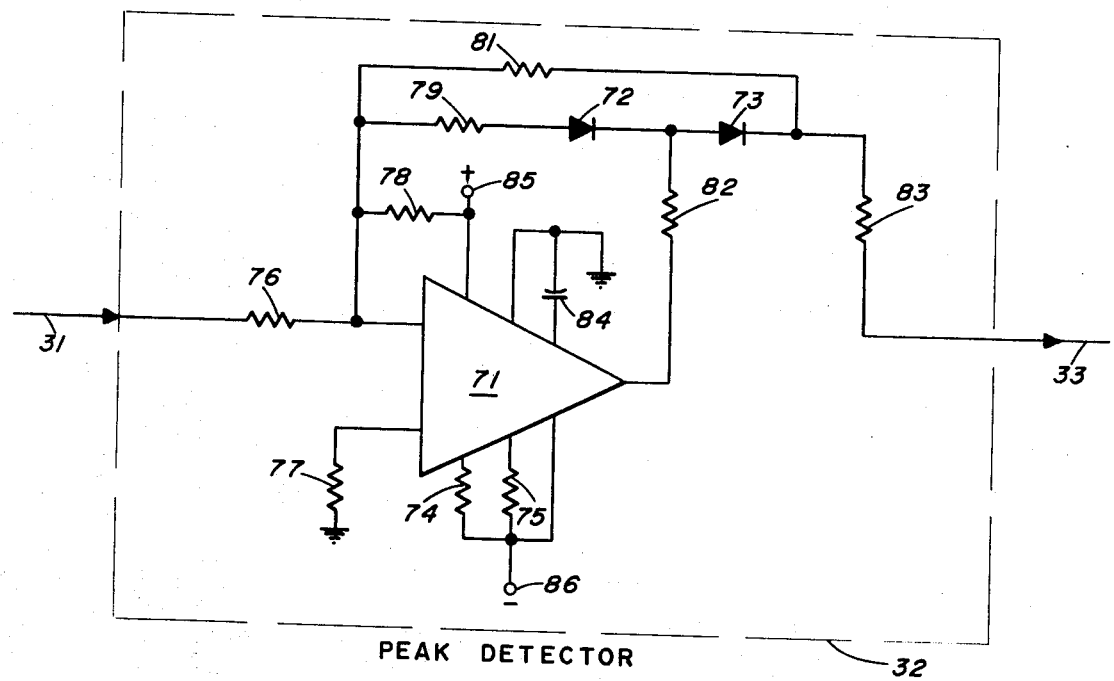
FIG. 3 depicts a schematic embodiment of a suitable scan amplitude detector means for use as the peak detector of FIG. 1.
Figure 4:
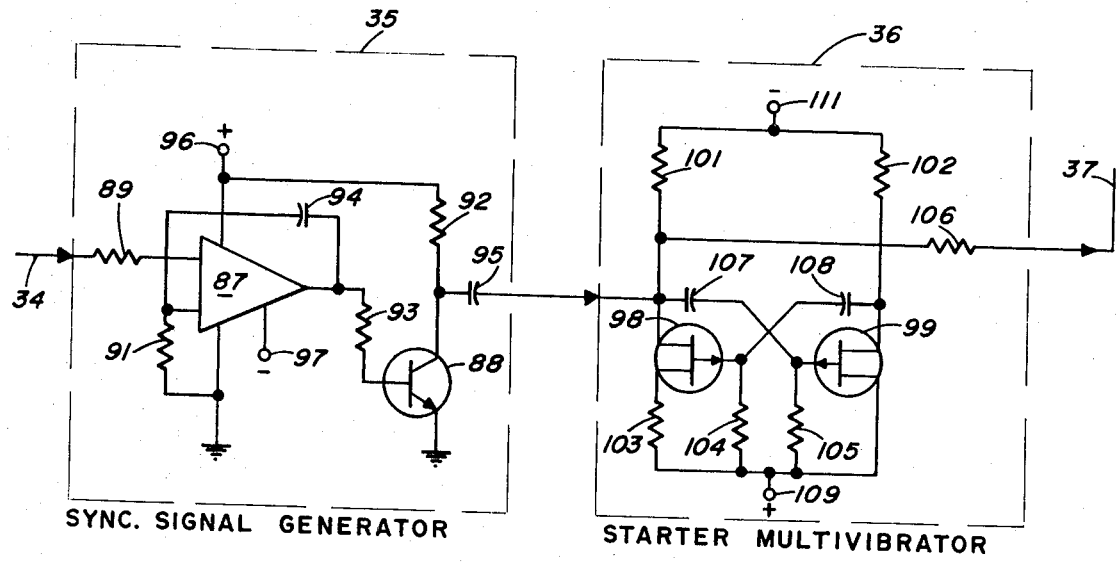
FIG. 4 shows suitable schematic embodiments of the synchronizing signal generator and starter multivibrator of FIG. 1.

Referring now to FIGS. 2, 3, and 4, respectively, there are shown detailed schematic diagrams for suitable embodiments of variable gain modulator 26, scan amplitude peak detector 32, and the automatic starting means comprised of synchronizing signal generator 35 and starting multivibrator 36. The specific circuit configuration within each of these and the other blocks of FIG. 1 are not believed to be a part of this invention, since their individual functions may be provided by devices commercially available or embodied by various circuit arrangements and values of discrete components, and/or appropriate integrated circuit elements. Thus, it is to be understood that the specific circuits of FIGS. 2, 3, and 4, and the types and values of components and integrated circuit elements set forth in the following Table I for utilization in these circuits and the various other blocks of FIG. 1, are presented only to provide one suitable embodiment of the control circuit comprising this invention, and are in no way intended to limit the invention thereto. It will be obvious to those skilled in the art that other values and components of a like nature may be utilized to accomplish similar results. The device has been constructed and successfully tested utilizing the various elements of Table I in the control circuit of FIG. 1.

TABLE I

With reference to FIG. 1

Mechanically resonant antenna system including antenna 11, spring means (torsion bar) 12, gear trains and connecting shafts 13 and 14, and rotor of servomotor 15—Resonant frequency of 10 Hz.

Servomotor 15—Kearfott T 110-36.
Servoamplifier 29—Kearfott C 70 3188 002.
Power source 27—115 v. A.C., 3-phase, 400 Hz.
Potential source 23——+12 v. D.C.
Potential source 24——−12 v. D.C.
Integrator 21—Fairchild integrated circuit SH 3000 coupled as an integrator.
Isolation amplifier 22—Fairchild integrated circuit SH 3000 coupled as an isolation amplifier.
Transducer 16—Center-tapped potentiometer, 2000 ohms.

With reference to modulator 26 of FIG. 2

Transistors 41 and 42—2N2918.
Transistors 43 and 44—Each, ½ of FE3728.
Transistor 45—FK 2369A.
Transistor 46—FT 30.
Diodes 47 and 48—MC 001.
Resistances 51 and 52—2,200 ohms.
Resistances 53 and 54—51,000 ohms.

Resistance 55—27,000 ohms.
Resistance 56—30,000 ohms.
Resistance 57—5,100 ohms.
Resistance 58—510 ohms.
Resistance 59—10,000 ohms.
Resistance 61—5,100 ohms.
Resistance 62—10,000 ohms.
Resistances 63 and 49—430 ohms.
Capacitance 64—1.0 mfd.
Capacitance 65—10 mfd.
Capacitance 66—18 mfd.
Potential source 67—+6 v. D.C.
Potential source 68——12 v. D.C.
Potential source 69——6 v. D.C.

With reference to peak detector 32 of FIG. 3

Integrated Circuit 71—Fairchild integrated circuit SH 3000.
Diodes 72 and 73—MC 001.
Resistances 74 and 75—240,000 ohms.
Resistance 76—6,800 ohms.
Resistance 77—5,100 ohms.
Resistance 78—25,000 ohms.
Resistance 79—3,300 ohms.
Resistance 81—68,000 ohms.
Resistance 82—100 ohms.
Resistance 83—10,000 ohms.
Capacitance 84—.1 mfd.
Potential source 85—+12 v. D.C.
Potential source 86——6 v. D.C.

With reference to FIG. 4

Synchronizing signal generator 35

Integrated circuit 87—Fairchild high-speed differential comparator μA 170.
    Transistor 88—FK 2369A.
    Resistances 89 and 91—220 ohms.
    Resistance 92—12,000 ohms.
    Resistance 93—1,300 ohms.
    Capacitance 94—.47 mfd.
    Capacitance 95—.022 mfd.
    Potential source 96—+12 v. D.C.
    Potential source 97——6 v. D.C.
Starting multivibrator 36—Free running at 9 Hz.
    Transistors 98 and 99—FT 30.
    Resistances 101 and 102—12,000 ohms.
    Resistance 103—2,200 ohms.
    Resistance 104—470,000 ohms.
    Resistance 105—1,100,000 ohms.
    Resistance 106—13,000 ohms.
    Capacitances 107 and 108—.1 mfd.
    Potential source 109—+6 v. D.C.
    Potential source 111——6 v. D.C.

OPERATION

The operation of the control circuit comprising the invention will be explained assuming that the antenna system including antenna 11 and its mechanical components have been constructed to be mechanically resonant at a desired scan frequency of 10 Hz., and that, accordingly, multivibrator 36 has been constructed so as to provide a square wave output signal at a slightly lower, free running frequency of 9 Hz. in the absence of a synchronizing signal from generator 35, as provided in Table I.

Referring now to FIG. 1, it will be assumed that antenna 11 is initially at rest in or near its center, or boresight, position due to the inherent centering property of the spring means (torsion bar) 12, and that it is now desired for the antenna to begin and maintain its high frequency scanning motion. Upon application of the necessary biasing potentials within each of the component blocks and activation of power source 27 (by any suitable switch means, not shown nor deemed to be a part of this invention), the starting multivibrator 36 will begin producing a square wave output signal at its free running frequency of 9 Hz. Since antenna 11 is initially assumed to be at rest and located in its center position, the output signal of position transducer 16, across conductors 18 and 19, will be zero. Consequently, there will be a zero output signal from integrator 21 to synchronizing signal generator 35, allowing multivibrator 36 to oscillate at its free running frequency of 9 Hz., slightly less than the mechanically resonant frequency of the antenna system. Also, there will be a zero output signal from isolation amplifier 22 to scan amplitude peak detector 32, causing detector 32 to allow modulator 26 to initially operate at maximum gain. The square wave output signal at 9 Hz. from multivibrator 36 is applied via conductor 37 to one of the two summing inputs of modulator 26 (see FIG. 2), wherein it modulates the 115 v. A.C., 400 Hz. signal from source 27, to produce an output signal on conductor 28. This modulated alternating current output signal on conductor 28 causes servoamplifier 29 to provide a modulated variable motor voltage signal to servomotor 15 which, in conjunction with the fixed motor voltage from phase one ($\phi_1$) of source 27, causes the rotor of servomotor 15 to begin rotating first in one direction, and then the other, at the multivibrator rate of 9 Hz. Since the rotor of servomotor 15 is mechanically coupled via gear trains and coupling shafts 13 and 14 to antenna 11, its rotation shocks the antenna into sinusoidal oscillatory motion at its mechanically resonant frequency of 10 Hz. This antenna motion causes position transducer 16 to begin providing a sinusoidal output signal to integrator 21 and isolation amplifier 22, whose polarity and amplitude are determined by the instantaneous direction (left or right) and distance respectively, of the antenna from boresight.

This sinusoidal signal from transducer 16 must be shifted in phase ninety degrees before being applied to modulator 26 via conductor 25, in order to obtain an output signal from modulator 26 which has the proper phase relation to cause servomotor 15 to aid the mechanically resonant oscillatory motion of antenna 11, in order to compensate it for frictional losses. The integrator 21 provides this phase shift. In addition to causing modulator 26 to provide this aiding control signal to servomotor 15 via servoamplifier 29, this transducer signal from integrator 21 is coupled, via conductor 34, to the input of signal generator 35 (see FIG. 4) which produces a synchronizing signal for multivibrator 36. This synchronizing signal causes multivibrator 36 to increase the frequency of its square wave output signal from its free running value of 9 Hz. to the mechanically resonant frequency (10 Hz.) of antenna 11 to assure "in phase," or synchronous, operation of the multivibrator with the signal from transducer 16, so long as antenna 11 continues in motion.

As previously indicated, at the time of initial starting of the antenna motion, the signal from transducer 16, via isolation amplifier 22, to scan amplitude peak detector 32 (see FIG. 3) will be at zero, causing detector 32 to allow variable gain modulator 36 to operate at its maximum gain level. As the rotations of servomotor 15 cause the antenna 11 to begin its sinusoidal oscillatory motion, the sinusoidal output signal from transducer 16 will increase in amplitude in direct proportion to the increasing scan amplitude of the antenna. When this signal reaches the preset threshold level of peak detector 32, indicating that antenna 11 has reached its desired maximum scanning amplitude, detector 32 will provide a signal via conductor 33 to the gain control input terminal of modulator 26 to decrease its gain to a level which will cause its modulated output signal to drive servomotor 15 just enough to compensate the mechanically resonant antenna system for frictional losses and maintain the peak scan amplitude of antenna 11 at the desired value.

If it should appear desirable for a particular application, a boresight holding loop might be added for stopping and holding antenna 11 in the boresight position. Such a loop might be comprised of an electrically actuated brake means attached to one of the coupling shafts between servomotor 15 and antenna 11, with suitable control means for activating the brake when the signal from position transducer 16 passes through "zero," indicating the antenna to be "on boresight."

Thus it may be seen, in view of the foregoing explanation and figures of drawing, that the invention, a control circuit for initiating and controlling the high frequency scanning motion of a small, mechanically resonant radar antenna system, is a useful and practical device.

While many modifications may be made in the disclosed embodiment of the invention by replacing various elements and components with equivalent structures, it is to be understood that I desire to be limited in the spirit of my invention only by the scope of the appended claims.

I claim:

1. A control circuit for enabling the antenna within a mechanically resonant antenna system to begin and maintain a high frequency scanning motion comprising:

driving means for coupling to said antenna, to provide an initial starting force thereto, and after starting to continuously aid the mechanically resonant motion thereof to compensate for losses in said antenna system;

position transducer means for coupling to said mechanically resonant antenna system to produce an electrical output signal indicative of the instantaneous relative position of said antenna with respect to its boresight axis;

electrical modulating means for producing a driving control signal for said driving means, said modulating means having first input means for coupling to a carrier frequency source of electrical power, having second input means for receiving said electrical output signal from said position transducer means, having third input means for receiving a starting signal, having gain control input means to receive a gain control signal for adjusting the gain of said modulating means, and having output means coupled to said driving means for providing said driving control signal thereto;

phase shifting means coupled between said position transducer means and said second input means of said electrical modulating means, for shifting the phase of said electrical output signal from said position transducer means in order that said driving control signal produced by said modulating means will be of the proper phase to cause said driving means to aid said mechanically resonant motion of said antenna system;

automatic starting means coupled between the output means of said phase shifting means and said third input means of said modulating means for providing said starting signal thereto; and scan amplitude sensing means coupled between said position transducer means and said gain control input means of said modulator means, for sensing the amplitude of the scan of said antenna and adjusting the gain of said modulator to cause said driving means to maintain said scan amplitude of said antenna at a predetermined desired level.

2. A control circuit for enabling the antenna within a mechanically resonant antenna system to begin and maintain a high frequency scanning motion as set forth in claim 1 wherein:

said driving means is comprised of a servomotor and servoamplifier, said servomotor having its rotor coupled to the drive mechanism of said mechanically resonant antenna system.

3. A control circuit for enabling the antenna within a mechanically resonant antenna system to begin and maintain a high frequency scanning motion as set forth in claim 1 wherein:

said position transducer means is comprised of a center-tapped potentiometer having its fixed resistance coupled between sources of direct current potential of equal magnitude and opposite polarity, and having its movable contact for mechanically coupling to said antenna for positioning by the movement of said antenna.

4. A control circuit for enabling the antenna within a mechanically resonant antenna system to begin and maintain a high frequency scanning motion as set forth in claim 1 wherein:

said phase shifting means is comprised of an electrical integrator means.

5. A control circuit for enabling the antenna within a mechanically resonant antenna system to begin and maintain a high frequency scanning motion as set forth in claim 1 wherein:

said automatic starting means is comprised of a synchronizing signal generator coupled in series with a multivibrator between the output of said phase shifting means and said third input means of said modulating means, said multivibrator being free running at a frequency slightly below the mechanically resonant frequency of said antenna system to provide a signal to said modulator for initially starting the scanning motion of said antenna, and being synchronized to operate at said mechanically resonant frequency by said synchronizing signal generator once said scanning motion has begun.

6. A control circuit for enabling the antenna within a mechanically resonant antenna system to begin and maintain a high frequency scanning motion as set forth in claim 1 wherein:

said scan amplitude sensing means is comprised of an isolation amplifier coupled in series with a peak detecting means between said position transducer means and said gain control input means, said isolation amplifier for reducing the loading on said position transducer, and said peak detecting means for providing a gain control signal to allow said modulator to operate at maximum gain until said electrical output signal from said position transducer means exceeds a predetermined threshold level then to adjust said gain to cause said driving means to maintain said scan amplitude of said antenna at a predetermined desired level.

7. A control circuit for enabling the antenna within a mechanically resonant antenna system to begin and maintain a high frequency scanning motion as set forth in claim 2 wherein:

said position transducer means is comprised of a center-tapped potentiometer having its fixed resistance coupled between sources of direct current potential of equal magnitude and opposite polarity, and having its movable contact for mechanically coupling to said antenna for positioning by the movement of said antenna;

said phase shifting means is comprised of an electrical integrator means;

said automatic starting means is comprised of a synchronizing signal generator coupled in series with a multivibrator between the output of said phase shifting means and said third input means of said modulating means, said multivibrator being free running at a frequency slightly below the mechanically resonant frequency of said antenna system to provide a signal to said modulator for initially starting the scanning motion of said antenna, and being synchronized to operate at said mechanically resonant frequency by said synchronizing signal generator once said scanning motion has begun; and said scan amplitude sensing means is comprised of an isolation amplifier coupled in series with a peak detecting means between said position transducer means and said gain control input means, said isolation amplifier for reducing the loading on said position transducer, and said peak detecting means for providing a gain control signal to allow said modulator to operate at maximum gain until said electrical output signal from said position transducer means exceeds a predetermined threshold level then to adjust said gain to cause said driving means to maintain said scan amplitude of said antenna at a predetermined desired level.

References Cited

UNITED STATES PATENTS 2,767,363  10/1956  Chubb _____ 343—757 X
2,825,052  2/1958  Nichinson et al. _____ 343—765

ELI LIEBERMAN, Primary Examiner

M. NUSSBAUM, Assistant Examiner

U.S. Cl. X.R.
343—766